United States Patent [19]
Lewis

[11] Patent Number: 5,120,599
[45] Date of Patent: Jun. 9, 1992

[54] CONTROLLED ELONGATION FIBER REINFORCED ELASTOMERIC FABRIC

[75] Inventor: Richard A. Lewis, El Segundo, Calif.

[73] Assignee: TRW Inc., Redondo Beach, Calif.

[21] Appl. No.: 506,301

[22] Filed: Apr. 9, 1990

[51] Int. Cl.⁵ .............................................. B32B 5/06
[52] U.S. Cl. ................................ 428/298; 428/222; 428/250; 428/297; 428/369; 428/902
[58] Field of Search ............... 428/152, 902, 250, 222, 428/297, 298, 369

[56] References Cited

U.S. PATENT DOCUMENTS

| | | | |
|---|---|---|---|
| 2,984,594 | 5/1961 | Runton | 154/52.1 |
| 3,519,530 | 7/1970 | Struble | 161/129 |
| 4,107,364 | 8/1978 | Sisson | 428/196 |
| 4,146,667 | 3/1979 | Stannard | 428/262 |
| 4,209,563 | 6/1980 | Sisson | 428/288 |
| 4,346,139 | 8/1982 | Osawa et al. | 428/252 |
| 4,820,143 | 4/1989 | Eroskey et al. | 425/122 |

Primary Examiner—James J. Bell
Attorney, Agent, or Firm—Noel F. Heal; Ronald L. Taylor

[57] ABSTRACT

A lightweight, compliant, high strength fabric providing controlled stretch, and a process for its manufacture. The fabric is consolidated into a unitary structure from a single stacked-film matrix of one or more thin elastomeric films, each having at least one reinforcing fiber embedded in the film in a sandwich construction. The reinforcing fibers are buckled along their length when the film is in a relaxed state, and if more than one fiber, arranged in a generally parallel relationship with each other within each elastomeric film. The stacked elastomeric films are cross-plied such that the courses of fibers in the separate films are aligned in selected multiple directions, with each course of fibers lying in its own plane. Stretching of the fabric in any of the selected multiple directions is uninhibited by the buckled fibers but is limited when the fibers reach a straightened condition. As the fabric stretches, the fibers straighten, eventually limiting the stretch of the fabric as the fibers become taut. When the stretch of the fabric is released, the fabric returns to its former relaxed state, with the fibers returning to their buckled state.

3 Claims, 1 Drawing Sheet

CONTROLLED ELONGATION FIBER REINFORCED ELASTOMERIC FABRIC

BACKGROUND OF THE INVENTION

This invention relates generally to the field of materials or fabrics and, more particularly, to high strength, compliant fabrics that stretch freely, are easily stowable, tough, and have specific elongation limits. Such fabrics are used in automotive air bag material, awnings, tents, portable structures, active wear garments, fatigues, and deployable, inflatable ballistic protective systems.

Fabrics that are high strength and tough are either made from high performance fibers or are a combination of films or plastic sheet materials and reinforcing fibers. Todays high performance fibers include Dacron, Nylon, aramids such as Kevlar, graphite (low to high modulus), ultra high molecular weight polyethylenes such as Spectra, and filamentary thermoplastic product forms such as PEEK, Ryton, PBI, Radel X, and assorted liquid crystal polymers such as Xydar, Victrex, and PBO. As reinforcements for structural materials, these fibers are combined and processed into a variety of textile materials. Usually a matrix material known as a binder, is combined with the fibrous reinforcement to produce a composite product which is tailored to meet specific performance requirements. An example of this kind of product is ballistic cloth. Ballistic cloth laminates are often bound with a polymer.

When films and plastic sheet materials require additional strength, the usual approach is to reinforce them with a fiber. This strengthening technique produces a material that is usually strong, but is also stiff and inelastic. The tendency in this type of fabric is for the film or sheet to tear or rip away from the reinforcement fibers when the material is overstretched. An example of this type of product is the tarpaulin commonly used in the trucking industry and sold in sporting good stores.

Reinforcing or reinforcing mesh is commonly fabricated on looms that lock fiber intersections by means of crossing a parallel fiber over and the perpendicular fiber beneath. Additionally, knitted textile products may have these fiber intersections fixed with a loop or lock stitch. Both of these types of reinforcing are weakened due to fiber crossover or the fibers being out of plane.

Other materials that exhibit elastic properties are of two types; those that are either elastomeric films or rubber compound sheets, or those that are basically multiple bands of slit sheet rubber overwrapped with organic fiber yarn that can be woven into an elastic fabric. Both of these types of materials are used for their ability to stretch and comply, yet return to their original size and shape when the tension is released or relaxed.

Elastic materials made from elastomeric films or rubber compound sheets prior to the present invention suffer from the disadvantage that when over-stretched, they rapidly begin thinning, and thereafter, tear or rupture. To inhibit this failure, elastomeric film or sheet products must be designed very conservatively; and are usually overly thick, bulky and therefore relatively heavy.

The elastic materials that use elastic thread hanks, which are basically multiple bands of slit sheet rubber, such as a latex based elastomer, stretched or tensile loaded and overwrapped with organic fiber yarn, suffer from the disadvantage that their degree of over-stretching is limited by the strength of the yarn. Once over-stretched these fabrics lose their ability to return to their original shape. Materials commonly used in the waistbands of undergarments and shock cords are examples of this kind of fabric.

It will be appreciated from the foregoing that there has long been a need for improvement in the field of stowable deployable elastomeric material. In particular, there has been a need for an elastomeric material that will stretch freely, and yet have elongation limits, while exhibiting high ultimate tensile strength, stowability, and toughness. The present invention satisfies this need.

SUMMARY OF THE INVENTION

The present invention resides in an elastomeric fabric with a novel combination of elastomeric sheet or film material sandwiched around and secured to reinforcing fibers that will stretch freely, be limited to a specific percentage elongation, while exhibiting high ultimate tensile strength, compliance and toughness. Briefly, and in general terms, the invention includes at least one thin elastomeric film or sheet for stretching, and one or more high performance reinforcing fibers for providing strength, toughness, and durability, and which are buckled during processing for providing a preselected limit of elongation. The invention can be a composite layered structure of multiple layers of thin films of elastomeric material, some or all containing a plurality of reinforcing fibers.

More specifically, the elastomeric sheeting or film, that is fused around and secured to the reinforcing fibers, is processed in a relaxed state. This prevents separation of the elastic sheeting from the reinforcing fibers and preserves continuity of the fabric. The sheets are cut to the desired size and shape for an item to be produced. In the preferred embodiment of this invention the elastomeric sheets are of urethane film.

The reinforcing fibers are buckled during processing by using multiple folds along the length of the fibers, such that the fibers have a reduced effective length. Since the processing is done with the elastomeric film in the relaxed state, as the fabric is stretched the fibers unbuckle and extend to limit elongation of the fabric when the fibers reach a straightened condition. As the stretch of the fabric is released, the elastomeric film relaxes and the reinforcing fibers return to their buckled state.

The reinforcing fiber can be a single strand of fiber encased in an elastomeric film to form a cord, or can take the form of a mesh formed as the plurality of thin elastomeric films, each having a plurality of buckled reinforcing fibers embedded in the film and arranged in a generally parallel relationship to each other. The films are oriented such that the fibers in each film are aligned in different selected directions, and the films are consolidated into a unitary structure. The total stretch of the fabric can be limited, that is, all of the reinforcing fibers are buckled and the reinforced thin elastomeric films are aligned in different directions, thus limiting the stretch along the length of the reinforcing fibers The fibers themselves can be either a single strand or made up of multiple strands such as yarn or tows. In the preferred embodiment of the invention the fibers are Kevlar yarn or tows.

In accordance with the method of the invention, the reinforcing fibers are buckled using multiple folds along the length of each fiber, and each fiber in each elastomeric film is aligned in a generally parallel course. The buckled and aligned reinforcing fibers are fused to the elastomeric film while it is in a relaxed state. The elastomeric films are cross-plied such that the courses of the reinforcing fibers in the separate films are aligned in selected multiple directions. The films are then consolidated into a single stacked-film matrix, in which each course of fibers lies in its own plane, and stretching of the film in any of the selected multiple directions is uninhibited by the buckled fibers but is limited when the fibers reach a straightened condition. When thermoplastic films are used as the elastomeric films, heating the matrix effects reprocessing into a desired form.

It will be appreciated from the foregoing that the present invention represents a significant advance in the field of controlled elongation fiber reinforced elastomeric fabric. In particular, the invention provides a stowable elastomeric fabric material that will stretch freely, yet be limited to a specific percentage of elongation while exhibiting high ultimate tensile strength and toughness. The controlled elongation fiber reinforced elastomeric fabric, exhibits many properties. Among these are controlled elongation, high ultimate breaking strength, inherent toughness and durability, as well as product form tailorability.

DESCRIPTION OF THE PREFERRED EMBODIMENT

Figure 1:
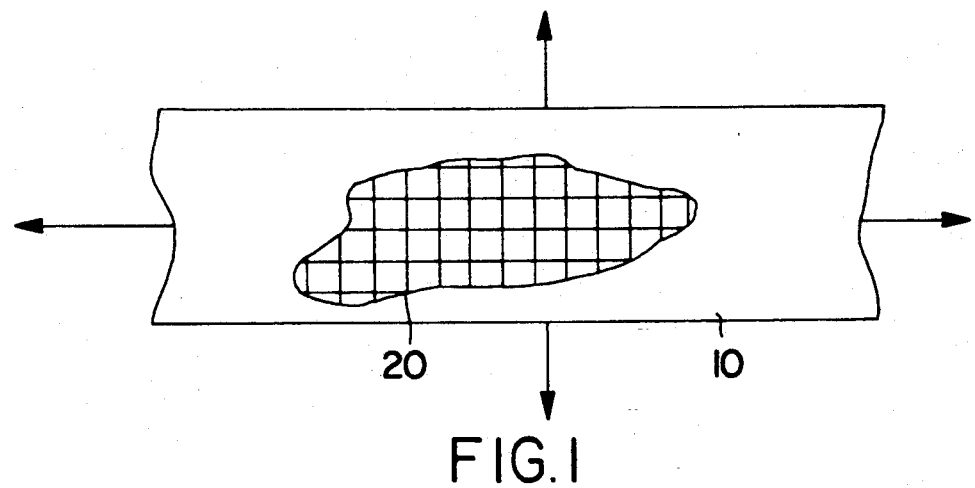
FIG. 1 is a fragmentary plan view of a controlled elongation fiber reinforced elastomeric fabric embodying the invention, shown in a stretched condition and partially cut away to expose reinforcing fibers.

As shown in the drawings for purposes of illustration the present invention is concerned with improvements in the field of controlled elongation fiber reinforced elastomeric fabric. Prior to this invention, controlled elongation fabrics included such products as high strength fibers, hybrid fabrics (such as ripstop nylon and similar textile products), elastomeric films, rubber compound sheet materials, and elastic and spandex material forms (fibers wrapped around rubber band stock). When films and plastic sheet materials require additional strength, the usual approach is to reinforce them with a fiber.

Although fiber reinforcement strengthens films and sheet materials, it also stiffens and restricts stretching of these materials. Usually, failure of fiber-reinforced films occurs because the film rips or tears away from the fiber.

Elastomeric films or rubber compound sheet materials are utilized for their elastic properties. One inherent problem with these materials is that when highly loaded (overstretched), they rapidly thin and, thereafter, tear or rupture. To inhibit this failure, the elastomeric film or sheet products must be designed very conservatively, using overly thick, bulky and therefore relatively heavy materials. Some other forms of elastomeric fabric are limited in maximum load by the strength of the yarn used.

In accordance with the present invention, a controlled elongation fiber reinforced elastomeric fabric includes elastic sheet or film material as indicated by reference numeral 10, that is cut or shaped to form a desired product; and a fiber reinforcement indicated by reference numeral 20. More specifically, as shown in FIG. 1, the elastomeric film 10 is fused around the reinforcing fiber in a sandwich construction to provide a continuous coating and prevent separating and tearing away. In the preferred embodiment of the invention the elastomeric fabric is of urethane film in combination with Kevlar yarn reinforcing, which produces a controlled stretch fabric that is compliant, lightweight, very strong, and limited to a specific percentage of elongation.

Figure 2:
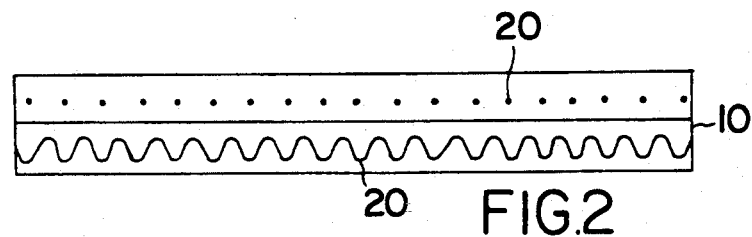
FIG. 2 is a cross sectional view of the controlled elongation fiber reinforced elastomeric fabric in its relaxed state.
Figure 3:
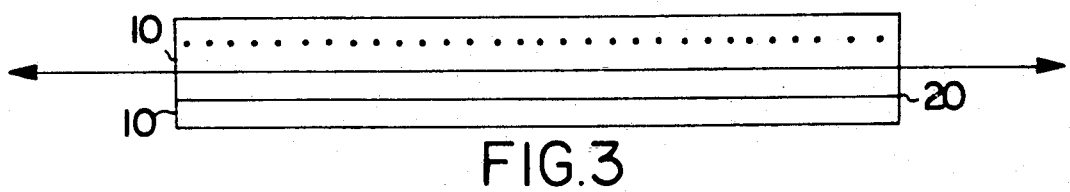
FIG. 3 is a cross sectional view similar to FIG. 2, but with the controlled elongation fiber reinforced elastomeric fabric at its elastic limit.
Figure 4:
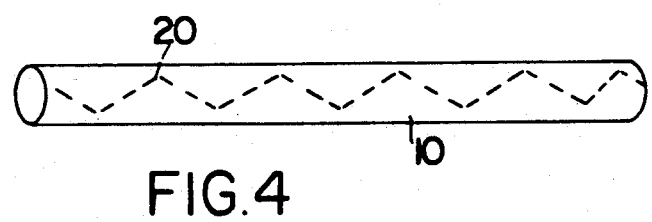
FIG. 4 is a simplified perspective view of the elongation fiber reinforced elastomeric fabric fused around a single reinforcing fiber to form a cord.

The fiber reinforcement 20 is buckled during processing and fused within the elastomeric film 10, as shown in FIGS. 2 and 4. When the fiber reinforcement 20 is buckled using multiple folds along the length of each fiber and thereby shortening the effective length of each fiber, the elastomeric sheet or film 10 is in a relaxed state. As the film 10 is stretched, the fibers 20 straighten and eventually limit the stretch of the film when the fibers become taut, as shown in FIG. 3. When the stretch of the film is released, the film 10 returns to its former relaxed state and the fibers 20 return to their buckled state. FIG. 4 shows a single fiber encased in the elastomeric film in the relaxed state to form an elastic cord.

FIG. 1,2, and 3 show a composite fabric with a plurality of thin elastomeric films 10, each containing a plurality of reinforcing fibers 20 embedded in the film and arranged in a generally parallel relationship with each other. The reinforcing fibers 20 are buckled along their length in a sinuous path when the films are in a relaxed state. The thin films are aligned and consolidated with the reinforcing fibers at the specified direction of 90 degrees to each other.

It will be appreciated from the foregoing that the present invention represents a significant advance in the field of controlled elongation fiber reinforced elastomeric fabrics. In particular, the invention provides for a high strength, controlled stretch elastomeric fabric which is flexible, compliant, durable, and versatile while eliminating the problems inherent in other currently available fabrics. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A controlled elongation elastomeric fabric, comprising:
    a plurality of thin elastomeric films, each having a plurality of reinforcing fibers embedded in the film and arranged in a generally parallel relationship with each other, the fibers being buckled into sinuous paths when the film is in a relaxed state;
    wherein the plurality of films are stacked and consolidated into a unitary structure and are oriented such that the fibers are aligned in different selected directions, to limit elongation in those directions as the fibers are unbuckled when the fabric is stretched; and wherein the fabric can be stretched in the selected directions.

2. A controlled elastomeric fabric as described in claim 1, wherein the reinforcing fibers of one film extend about a ninety degree angle to the reinforcing fibers of another film.

3. A controlled elongation elastomeric cord comprising:
   at least one thin elastomeric film;
   at least one reinforcing fiber;
   wherein the elastomeric film is fused around the reinforcing fiber to form a cord with limited elongation along its length;
   the fiber being in a buckled state when the elastomeric film is in a relaxed state; and
   whereby, as the cord is stretched, the fiber is unbuckled and extended to limit elongation of the cord.

* * * * *